(12) United States Patent
Thayer

(10) Patent No.: US 6,601,886 B1
(45) Date of Patent: Aug. 5, 2003

(54) ENERGY ABSORBING COMPOSITE TUBE

(75) Inventor: Christopher M. Thayer, Pleasanton, CA (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 10/159,653

(22) Filed: May 31, 2002

(51) Int. Cl.7 .............................................. B60R 19/34
(52) U.S. Cl. ...................... 293/133; 293/130; 296/189
(58) Field of Search .............................. 293/133, 132, 293/120, 130; 188/371, 376, 378; 296/188, 189

(56) References Cited

U.S. PATENT DOCUMENTS

| | | | |
|---|---|---|---|
| 3,552,525 A | * 1/1971 | Schudel | 188/377 |
| 3,948,501 A | * 4/1976 | Schwemmer | 293/1 |
| 3,972,551 A | 8/1976 | Fannin | |
| 4,061,386 A | 12/1977 | Chupick | |
| 4,097,080 A | 6/1978 | Petry | |
| 4,149,742 A | 4/1979 | Fannin et al. | |
| 4,336,868 A | * 6/1982 | Wilson et al. | 293/133 |
| 4,466,646 A | 8/1984 | Delmastro et al. | |
| 4,573,724 A | 3/1986 | Campen | |
| 4,601,367 A | * 7/1986 | Bongers | 293/133 |
| 4,830,418 A | 5/1989 | Gest | |
| 5,035,307 A | 7/1991 | Sadeghi et al. | |
| 5,116,092 A | 5/1992 | Schönleber | |
| 5,419,416 A | * 5/1995 | Miyashita et al. | 188/371 |
| 5,785,367 A | * 7/1998 | Baumann et al. | 293/133 |
| 2001/0035658 A1 | 11/2001 | Anderson et al. | |

FOREIGN PATENT DOCUMENTS

EP  0 323 038 A2  7/1989

* cited by examiner

*Primary Examiner*—D. Glenn Dayoan
*Assistant Examiner*—Lori L Coletta
(74) *Attorney, Agent, or Firm*—Shapiro & Dupont LLP (57) ABSTRACT

An energy absorbing composite tube for both mounting an impact member to a structure and absorbing impact energy. The composite tube includes a mounting portion that is inserted into a sleeve within the structure. A main tubular body portion is provided that is integral with the mounting portion. The main tubular body portion has a larger diameter than the mounting portion to provide an impact shoulder. A delamination wedge is forced against the shoulder during an impact to cause delamination of the main tubular body portion. The delamination process absorbs energy from the impact. The mounting portion slides within the mounting sleeve during the impact so that it remains intact and provides a structural connection between the main tubular body portion and the impact member. The energy absorbing composite tube may be used to replace bumper mounting systems which utilize metallic tubes as part of the bumper mounting/energy absorption system.

32 Claims, 5 Drawing Sheets

ENERGY ABSORBING COMPOSITE TUBE

BACKGROUND OF THE INVENTION

1. Field of the Invention

The present invention relates generally to systems and methods for absorbing energy that is generated during a collision. More particularly, the present invention involves bumper systems for vehicles wherein the structure that is used to mount the bumper to the vehicle is also designed to absorb impact energy during a crash.

2. Description of Related Art

Bumper systems are commonly used on a wide variety of structures to protect the structure and/or its occupants during a collision. Bumper systems have been an integral and important part of automobile design for many years. As a result, many different types of systems have been developed. A popular type of bumper system is one that includes a bumper or impact member that is mounted to the vehicle using some type of mounting system that is able to absorb some of the impact energy during a collision. Mounting systems using pneumatic shock absorbers provide good absorption of impact energy and are able to withstand multiple minor impacts. However, such systems are relatively expensive and may require periodic maintenance.

Bumper supports that utilize metallic tubes which undergo lengthwise crushing during impact have also been popular. The metallic tubes provide a strong connection between the bumper and the vehicle. However, the specific energy absorption (kj/kg) of metallic tubes during crushing is not particularly high. In addition, the initial force required to initiate longitudinal crushing of a metallic tube may be too high for many situations.

Tubes made from composite materials are known to have a higher specific energy absorption than their metallic counterparts. This higher level of energy absorption is due in part to the energy absorbed when the composite tube undergoes inter-laminar splitting during longitudinal crushing. The basic problem with using composite tubes as the energy absorbing element is that the destruction of the tube that results during crushing renders the tube unable to support the bumper after a crash. In contrast, metallic tubes retain sufficient strength after crushing to provide adequate post crash support of the bumper.

As is apparent from the above, there is a present need to provide a simple energy absorbing system that has both the energy absorbing capabilities of a composite tube and the post-crash support strength of a metallic mounting system.

SUMMARY OF THE INVENTION

In accordance with the present invention, an energy absorbing composite tube is provided that is an efficient impact energy absorber and which retains good post-impact strength for maintaining a secure bumper-vehicle connection. The energy absorbing composite tube is particularly well-suited for connecting bumpers to automobiles. However, the energy absorbing composite tube may be used in any situation where two or more impact members are connected together. Typically, the invention is useful where a structure (first impact member) is protected by a bumper (second impact member) that is connected to the structure via an energy absorbing mounting system.

Energy absorbing composite tubes in accordance with the present invention are designed to provide an energy absorbing mount between a first impact member and a second impact member. The energy absorbing composite tubes include a mounting portion that is integral with a main tubular body portion. The mounting portion has a first impact member mounting end that is insertable into a sleeve or receptacle located in the first impact member. The mounting portion is made up of fibers embedded in a resin matrix and has an outer perimeter that is sized and shaped to matingly fit with the receptacle. The energy absorbing composite tube further includes a main tubular body portion that is integral with the mounting portion. The main tubular body portion is also made from one or more layers of fibers which are embedded in a resin matrix. The fiber layers and resin matrix may be the same or different from the mounting portion. The main tubular body portion has a perimeter that is larger than the mounting portion to provide a shoulder that extends around the perimeter of the mounting end where it meets the main tubular body.

As a feature of the present invention, a delamination wedge is provided that is located adjacent to the shoulder on the energy absorbing composite tube. The delamination wedge is forced against the shoulder during an impact. The resulting delamination of the main tubular body absorbs energy from the impact. The use of a delamination wedge reduces or eliminates the initial peak load that is usually necessary to initiate the delamination process. In addition, the delamination wedge eliminates the debris wedge that may form during longitudinal crushing of a tube made from composite materials.

As a further feature of the present invention, the mounting portion of the composite tube is not crushed and remains intact during the delamination process. The sleeve or receptacle in the impact member merely slides over the mounting portion as the delamination wedge is forced into the shoulder. The mounting portion and main tubular body retain sufficient structural integrity and strength to provide adequate post-crash support between the first and second impact members.

The present invention is directed not only to the energy absorbing composite tube, but also to the bumper systems and vehicles to which the energy absorbing composite tube is attached. In addition, the invention covers methods for making the energy absorbers and absorbing energy during an impact wherein the energy absorbing composite tube is utilized.

The present invention provides an especially useful energy absorbing mounting system that can be fine-tuned to provide a wide variety of energy absorption profiles. The number and/or types of laminates in the mounting end and main tubular body may be varied to provide a wide variety of shoulder sizes and shapes that have a direct relation to the amount of energy absorbed during delamination. In addition, the laminate layers in the main tubular body can be staggered to provide a stepped shoulder where the delamination wedge contacts each layer sequentially during a crash. Such stepped shoulder arrangements allow one to fine-tune the energy absorption profile. In addition a second mounting portion can be included at the end of the main tubular body that is mounted to the second impact member. This produces a second shoulder adjacent to the second impact member that can be used in combination with a second delamination wedge to provide even further energy absorption capabilities.

The energy absorbing composite tube of the present invention is a suitable replacement for metallic tube-type bumper mounting systems since it provides post-crash mounting strength equivalent to metallic tubes while at the same time providing for particularly effective energy absorption when the bumper is impacted.

The above described and many other features and attendant advantages of the present invention will become better understood by reference to the following detailed description when taken in conjunction with the accompanying drawings.

BRIEF DESCRIPTION OF THE DRAWINGS

FIG. 7 depicts three exemplary delamination wedges in accordance with the present invention.

FIG. 8 shows three exemplary load versus displacement graphs for energy absorbing composite tubes utilizing the delamination wedges shown in FIG. 7.

DETAILED DESCRIPTION OF THE INVENTION

Figure 1:
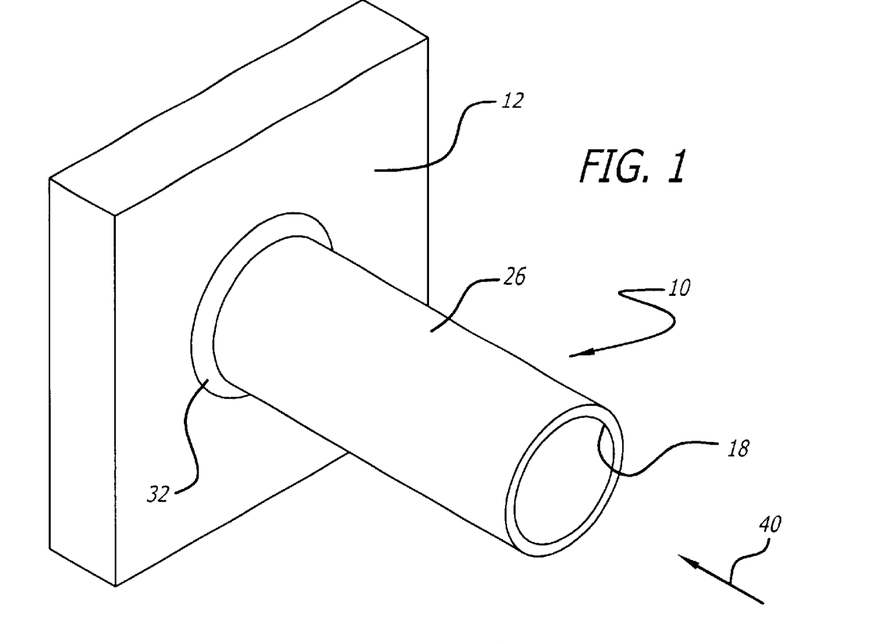
FIG. 1 is a perspective view of an exemplary energy absorbing composite tube in accordance with the present invention that is inserted within a sleeve in a first impact member. The first impact member, such as a mounting plate that is secured to a vehicle, is shown generally as a square block.
Figure 2:
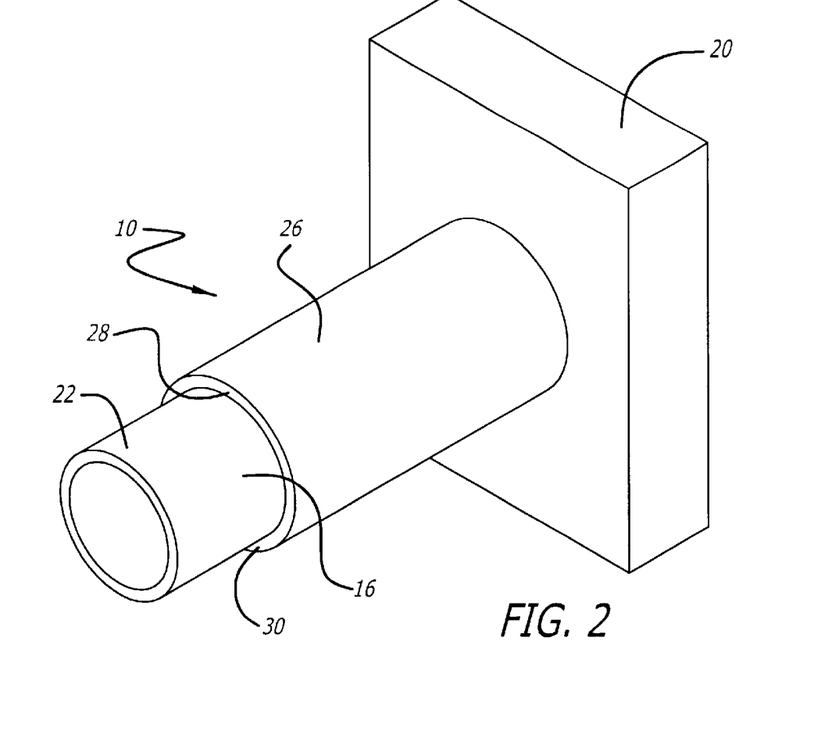
FIG. 2 depicts the exemplary energy absorbing tube mounted to a second impact member. The second impact member, such as a vehicle bumper, is shown generally as a square block.
Figure 3:
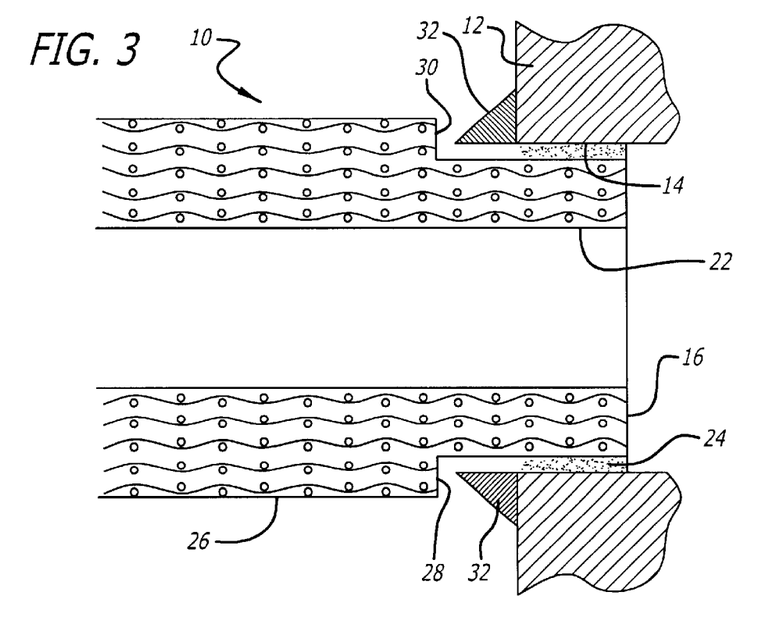
FIG. 3 is a partial sectional view of FIG. 1 taken in the 3—3 plane prior to an impact.

An energy absorbing composite tube in accordance with the present invention is shown at 10 in FIGS. 1–3. The tube 10 is shown inserted within a receptacle or sleeve located in a first impact member such as the frame or other mounting structure on an automobile 12. As best shown in FIG. 3, the receptacle into which the tube is inserted is a circular sleeve 14. The preferred use for tube 10 is in mounting second impact members, such as bumpers, to vehicles. However, the tube 10 may be used to connect any type of bumper to an underlying structure. Impact member, as used herein, means any type of bumper or other structure that is mounted to one of the ends of the composite tube 10. Preferably, the first impact member will be a structure on a vehicle to which the composite tube is mounted. The second impact member is the bumper that is mounted to the other end of the composite tube. The energy absorbing composite tube may be used in any situation where one or both of the impact members are subjected to collisions with foreign objects. However, the preferred use of the energy absorbing composite tube is to mount a second impact member (e.g., bumper) to a first impact member (e.g., vehicle) to provide protection of the vehicle and/or its occupants from collisions with foreign objects.

The tube 10 includes a main tubular body portion 26 that has a second impact member mounting end 18 which is connected to a second impact member, such as a bumper, which is shown as block 20. The bumper 20 is preferably an automobile bumper. However, the main tubular body 26 may be connected to any type of bumper or other structure where impact protection is desired. The main body portion 26 may be connected to the bumper 20 by a wide variety of connection configurations. Preferably the tube is inserted within a matching sleeve in the bumper and bonded in place using an appropriate adhesive.

The composite tube 10 also includes a mounting portion 16 that is integral with the main tubular body portion 26. The mounting portion 16 has a first impact member mounting end 22 that is inserted within the sleeve 14 located in a mounting structure 12 on the vehicle. The mounting end 22 is preferably bonded to the mounting structure 12 using an adhesive shown at 24. The adhesive 24 should provide a sufficiently strong bond to prevent the tube end 22 from coming out of the vehicle sleeve 14 under normal circumstances. However, the adhesive must have a sufficiently low shear strength to allow the mounting portion 16 slide within vehicle mounting sleeve 14 when the bumper 12 is impacted during a collision. Exemplary adhesives which may be used include epoxy, urethane, and polyester. Other adhesives may be used so long as they provide adequate bonding strength to keep the mounting portion 16 secure within the sleeve 14 during normal operation of the vehicle, while having a shear strength that is sufficiently low to allow the mounting portion 16 to slide within the vehicle mounting sleeve 14 during a collision.

The mounting portion 16 has an outer perimeter that is preferably circular in shape. Other shapes are possible including oval shaped tubes and polygon shaped tubes, such as square tubes or octagonal shaped tubes. The length and diameter of the mounting portion 16 may be varied depending upon the particular application. The mounting portion 16 is preferably made from at least a one layer laminate. Typically, the mounting portion will include the number of laminates that are necessary to provide adequate mounting of the bumper and main tubular body to the vehicle. This will depend upon the bumper/vehicle size and the vehicle type. As shown in FIG. 3, the mounting portion 16 is a three layer circular laminate. The mounting portion 16 includes three layers of woven fabric that are embedded in a resin matrix. A three layer laminate is shown for exemplary purposes only. The woven fabric may be made from any of the fibers used to make composite materials including glass, carbon, ceramic, aramid, and thermoplastic. Woven fabrics are preferred. However, unidirectional fiber orientation as well as random fiber mat may be used. Also, randomly oriented chopped fibers embedded in a resin matrix are acceptable.

The resin in which the fiber layers are embedded may also be any of the well-known materials that are used as the matrix in composite materials. Exemplary resins include epoxy, nylon, polyester, vinylester, polypropylene, and acrylic.

The energy absorbing composite tube 10 includes a main tubular body portion 26 that is integral with the mounting portion 16. The main tubular body portion 26 preferably includes at least one more laminate layer than the mounting end 16. As shown in FIG. 3, the main tubular body 26 has two more laminate layers than the mounting portion 16. Two extra laminate layers are shown for exemplary purposes only with it being understood that many more laminates are possible, if desired. The main tubular portion 26 and mounting portion 16 are preferably made using the same fibers and resins. The mounting portion 16 and shoulder 30 are preferably formed by machining or otherwise removing the desired number of laminates from the main tubular body portion 26. Alternatively, the composite tube may be formed in a single molding step where the mold is shaped to provide a main tubular body portion that transitions via a shoulder to the mounting portion. In addition, the main tubular portion may be formed by laminating additional layers of fibers onto a previously formed inner tube. The additional layers are positioned such that a shoulder is formed on the inner tube to provide the desired shoulder for delamination. If desired, the additional laminates can be added to an uncured inner tube and cured together with the inner tube resin matrix.

The main tubular body portion 26 has an end 28 where it transitions into the mounting portion 16 to provide the previously mentioned shoulder 30. The shoulder 30 extends around the perimeter of the mounting portion 16. The size or depth of the shoulder 30 will depend upon the number and size of extra laminates or fibers that are used to form the main tubular body. This in turn will depend upon the amount of energy that needs to be absorbed and the initial peak load desired to initiate delamination of the main tubular body portion 26. The size and shape of the shoulder 30 may also be controlled by the shape of the mold, if one is used to form the composite tube. The size and shape of the shoulder 30 will depend upon each particular application and will be determined by routine experimentation. An advantage of the present invention is that the energy absorbing characteristics of the composite tube may be varied widely and controlled accurately by choosing particular combinations of fiber size, fiber type, fiber orientation, shoulder size, shoulder shape and resin matrix type.

A delamination wedge 32 is located around the perimeter of the mounting portion 16 adjacent to the shoulder 30. The delamination wedge 32 may be mounted to the vehicle mounting structure 12 or it may be mounted on the mounting portion 16. If desired, the wedge can be made as an integral part of the mounting structure 12. The wedge 32 is made from a hard material, such as a metal, that is capable of delaminating the composite material of the main tubular body portion 26. The material used to make the wedge should be harder than the composite tube 10 and should be at least hard enough to initiate delamination of the tube as shown in FIG. 4.

Figure 4:
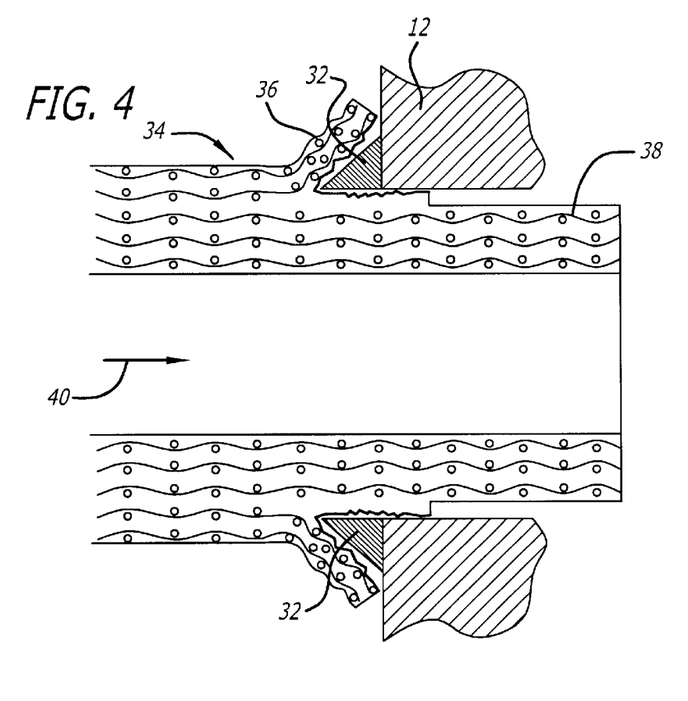
FIG. 4 is the same sectional view of FIG. 1 as shown in FIG. 3 except that the tube has undergone delamination due to an impact.

Referring to FIG. 4, the composite tube is shown at 34 after an impact in which the main tubular body portion 36 has been delaminated by movement of the wedge 32 against the shoulder 30. The process of delamination has been found to be an efficient absorber of impact energy. The direction of impact is represented by arrow 40. The degree of delamination is related to the amount of energy that is absorbed. As the impact energy load increases, the amount of the main tubular body that is delaminated and deformed also decreases.

The delamination wedge is designed to cause delamination of the main tubular body 26 when the wedge 32 is forced into the shoulder 30. Use of a delamination wedge reduces or eliminates the initial peak load that would otherwise be required to start the delamination. The shape of the delamination wedge may also be varied. The wedge shown at 32 has a surface angle relative to the shoulder that is designed to split the composite material apart as the shoulder is force against the wedge. The wedge geometry should be such that the delamination or separation of the composite material occurs when the wedge is forced against the shoulder. The wedge shape may be varied depending upon the fiber/resin type and orientation. For example, the wedge shape for delaminating layers of woven fabric may be different than wedges used to delaminated randomly oriented chopped fibers.

The use of a delamination wedge provides the advantage of being able to further fine tune the energy absorption characteristics of the composite tube. For example, the wedge can be shaped to have a slight blunt edge which is designed to increase the initial peak load required to cause delamination. This configuration is desirable where there is concern over possible premature delamination of the composite tube during minor collisions. Alternatively, the wedge can have a relatively sharp edge that reduces the initial peak load required to cause delamination. Reduction of the initial peak load required to start delamination is important in situations where it is desirable to limit the initial shock to vehicle occupants or fragile cargo during a collision.

Figures 7A, 7B, 7C:
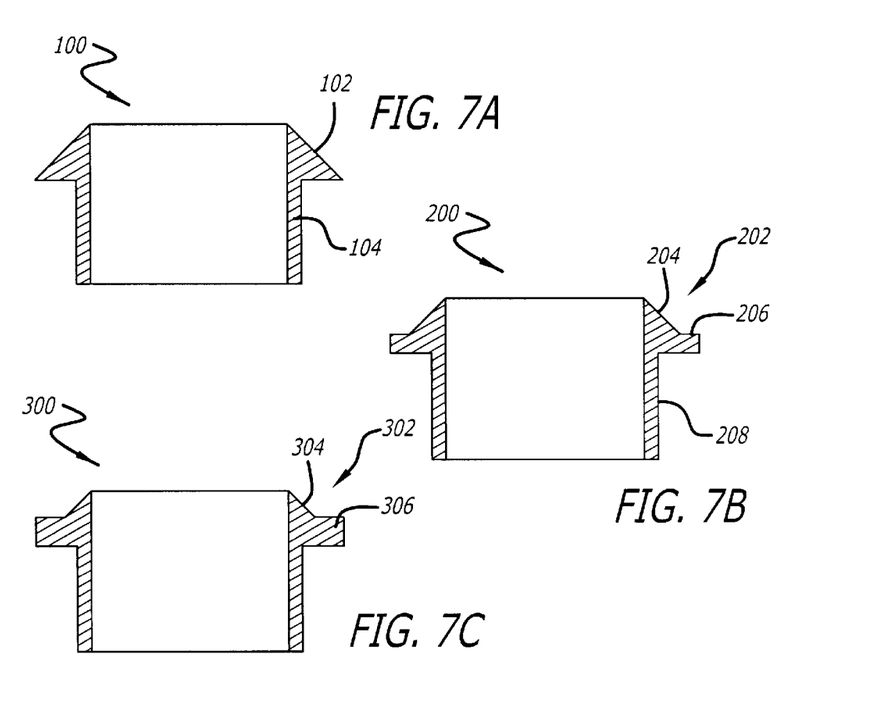
FIG. 7A shows the cross section of a delamination wedge having a constant 45° angle.
FIG. 7B shows the cross section of a delamination wedge which has a 45° angle that transitions to a 90° angle after 0.043 inch.
FIG. 7C shows the cross section of a delamination wedge which transitions from a 45° angle to a 90° angle after 0.030 inch.

Three exemplary delamination wedges are shown in FIG. 7. In FIG. 7A, an exemplary delamination wedge is shown at 100 wherein the leading edge of the wedge 102 is at a 45° angle relative to the main tubular body portion. The delamination wedge 100 includes a mounting portion 104 that is designed to mount the wedge within the receptacle in the first impact member. A second exemplary delamination wedge is shown at 200 in FIG. 7B. The delamination wedge 200 has a leading face 202 which starts as a 45° angle 204 and transitions after 0.043 inch to a 90° angle as shown at 206. The delamination wedge 200 also includes a main body portion 208 that is insertable within the receptable in the first impact member. A third exemplary delamination wedge is shown at 300 in FIG. 7C. The delamination wedge 300 is the same as delamination wedge 200, except that the initial leading edge 304 of wedge 302 extends for 0.030 inch instead of 0.043 inch. The edge 304 then transitions to a 90° surface 306 in the same manner as delamination wedge 200.

Figure 8A:
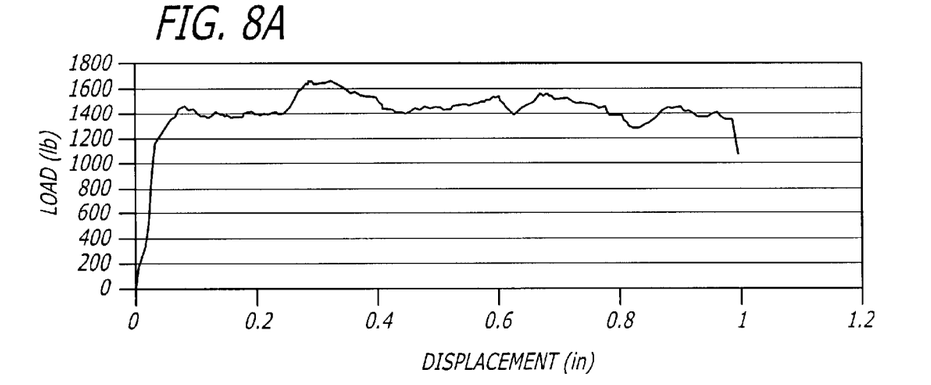
FIG. 8A is the load versus displacement curve for an energy absorbing composite tube utilizing the delamination wedge shown in FIG. 7A.
Figure 8B:
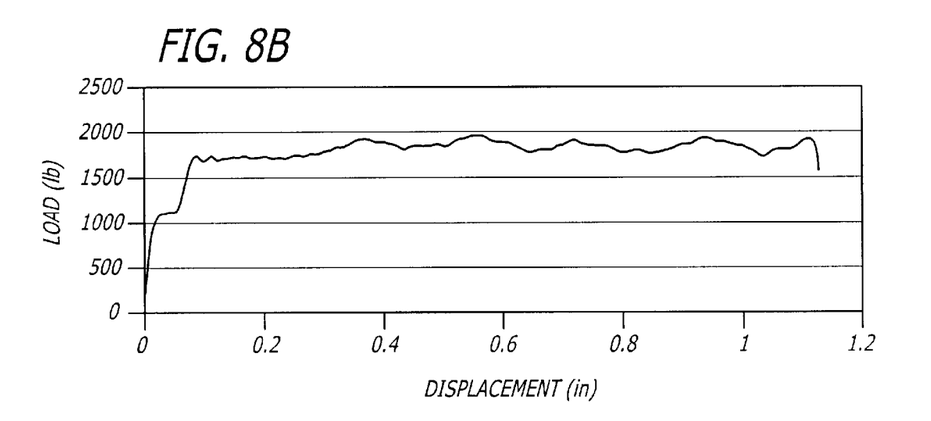
FIG. 8B is the load versus displacement curve for an energy absorbing composite tube using the delamination wedge shown in FIG. 7B.
Figure 8C:
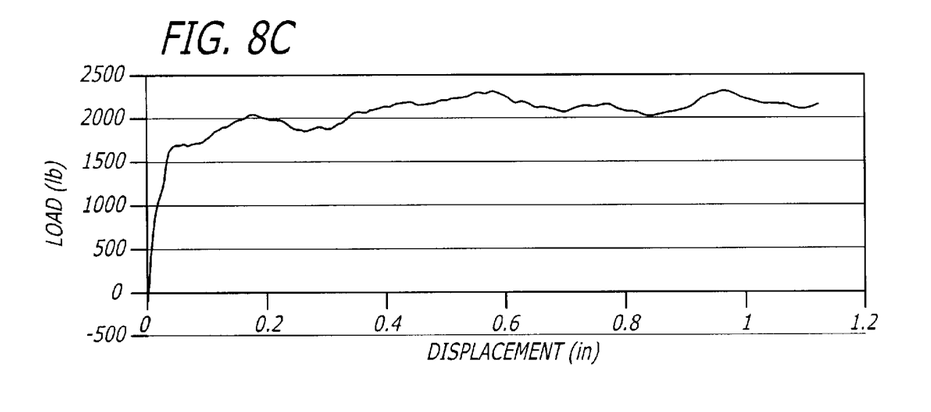
FIG. 8C is the load versus displacement curve for an energy absorbing composite tube utilizing the delamination wedge shown in FIG. 7C.

The three exemplary delamination wedges shown in FIG. 7 were used to make energy absorbing composite tubes in accordance with the present invention that were subjected to crushing tests. The main tubular body and mounting portions were the same for each test with only the delamination wedge being changed. Referring to FIG. 8, the results of crush tests using delamination wedge 100 are shown as graph A. The total energy absorbed was 1420.81 (lb-in). The maximum load was 1671 pounds with a delamination wedge displacement of 1.00 inch. The energy absorption efficiency was 85 percent. The crush test results for delamination wedge 200 are shown in graph B where the total energy absorbed was 1978 (lb-in) with a maximum load of 1946 pounds. The delamination wedge 200 was displaced 1.13 inch and the energy absorption efficiency was 90 percent. The load versus displacement graph for delamination wedge 300 is shown at FIG. 8C. The total energy absorbed was 2285 (lb-in) with a maximum load of 2291 pounds. The delamination wedge 300 was displaced 1.13 inch with a energy absorption efficiency of 88 percent. As can be seen from the load versus displacement curves in FIGS. 8A–C, minor changes in the geometry of the delamination wedge produced measurable changes in the energy absorption profiles. For example, the transition from a 45° angle wedge to a 90° angle wedge resulted in an increase of maximum loading from around 1670 pounds to over 2000 pounds. As is apparent, many other wedge configurations are possible which may be used to achieve desired initial loading and subsequent energy absorption profiles.

As can be seen from FIG. 4, even after an impact in which the main tubular body has been delaminated, the part of the main tubular body portion that has moved into the mounting sleeve 38 remains intact and structurally connected to the vehicle 12 to provide continued support of the bumper 20. As a result, the composite tube is able to provide the efficient impact energy absorption characteristics of composite delamination without destroying the basic function of the composite tube which is to mount the bumper to the vehicle.

Figure 5:
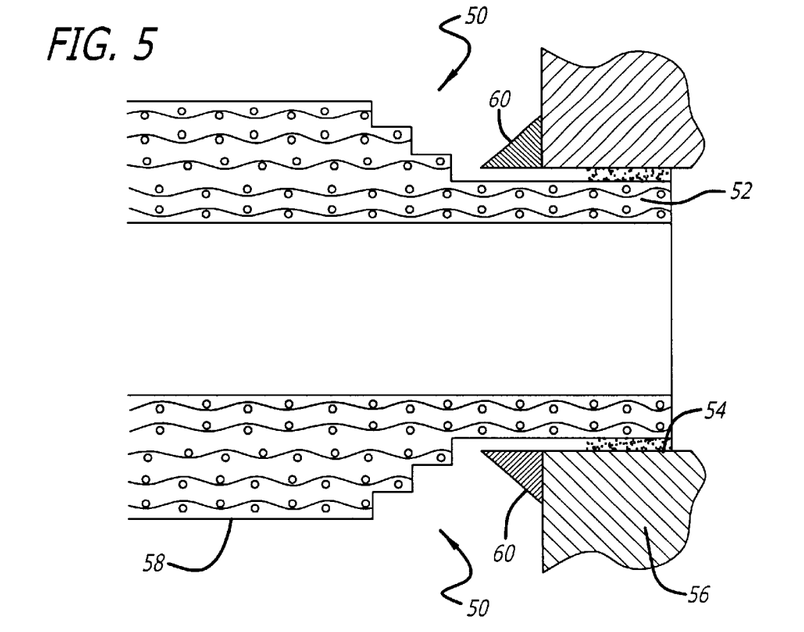
FIG. 5 is a sectional view of an energy absorbing composite tube in accordance with the present invention showing an alternate exemplary type of shoulder.

The shape of the shoulder between the main tubular body portion and the mounting portion can be varied to provide different energy absorption characteristics and profiles. For example, an alternative shoulder configuration is shown at 50 in FIG. 5. The mounting portion 52 includes a two layer tubular woven fiber laminate that is adhesively bonded into circular sleeve 54 in the vehicle mounting plate 56. The main tubular body portion 58 includes an additional three layers of woven fiber laminate. The main tubular body 58 has been machined to remove a portion of the extra three layers to provide the mounting portion 52 and the staggered shoulder arrangement as shown at 50. The delamination wedge 60, during an impact, contacts the laminates sequentially as the wedge moves into the shoulder. This sequential contact of the shoulder laminates with the wedge allows one to control the initial energy absorption profile during delamination. As is apparent, a wide variety of other shoulder configurations are possible. For example, the stepped shoulder shown in FIG. 5 could be reversed so that the outer laminate is the first to be contacted by the delamination wedge 60. In addition, the number of layers used in each step of the shoulder could be varied to provide further refinements in the energy absorption profile as the delamination wedge moves further into the shoulder.

Figure 6:
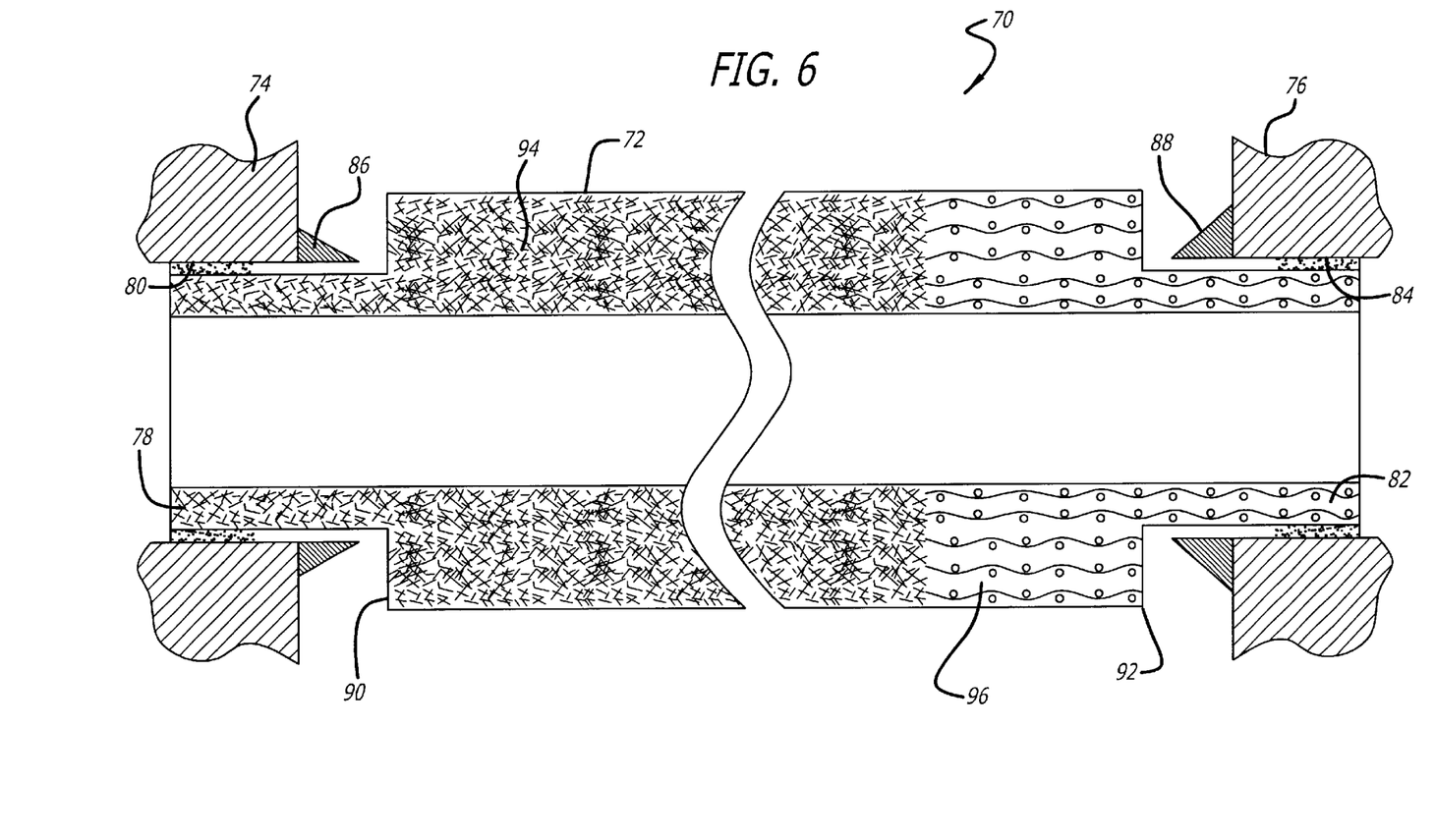
FIG. 6 is a sectional view of an energy absorbing composite tube in accordance with the present invention showing an alternate exemplary embodiment that includes shoulders and delamination wedges at both ends of the composite tube.

The energy absorption characteristics of the composite tube may be further varied and controlled by providing mounting portions and delamination wedges at both ends of the composite tube. Such an arrangement is shown at 70 in FIG. 6. The composite tube 70 includes a main tubular body portion 72 that is mounted between a first impact member shown at 74 and a second impact member shown at 76. A first mounting end 78 is mounted into a sleeve 80 in the first impact member 74. A second mounting end 82 is mounted into a sleeve 84 in the second impact member 76. Delamination wedges 86 and 88 are provided to initiate delamination of the main tubular body at shoulder locations 90 and 92, respectively. The delamination wedge 86 has a steeper slope (i.e., it is sharper than) the delamination wedge 88. Accordingly, the shoulder 90 will begin to delaminate at lower peak loads than shoulder 92, if all other parameters are equal. In addition, the orientation and types of fibers and resins may be varied to achieve even further energy absorption control. For example, as shown in FIG. 6, part of the main tubular body portion 72 may include randomly oriented fibers 94 while another portion may include woven fiber layers 96.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. An energy absorbing composite tube for use in mounting a first impact member to a second impact member and absorbing impact energy when one of said impact member is impacted, said energy absorbing composite tube comprising:
   A) a composite tube having a longitudinal axis, said composite tube comprising:
      a) a mounting portion comprising a first impact member mounting end that is insertable within a receptacle located in said first impact member, said mounting portion comprising fibers embedded in a resin matrix to form said mounting portion having an outer perimeter;
      b) a main tubular body portion that is integral with said mounting portion, said main tubular body portion comprising an end that is mountable to said second impact member, said main tubular body portion comprising fibers embedded in a resin matrix to form a main tubular body portion having an outer perimeter that is larger than the outer perimeter of said mounting portion to provide a shoulder around the perimeter of said mounting portion where it joins said main tubular body portion; and
   B) a delamination wedge located around the perimeter of said mounting portion adjacent to said shoulder, said delamination wedge shaped to provide delamination of said main tubular body portion when said delamination wedge is forced against said shoulder by said first impact member during an impact in which said first and second impact members move towards each other along the longitudinal axis of said composite tube, said delamination of said main tubular body portion providing absorption of said impact energy.

2. An energy absorbing composite tube according to claim 1 wherein the end of said main tubular body portion that is mountable to said second impact member comprises a second integral mounting portion comprising a second impact member mounting end that is insertable within a receptacle located in said second impact member, said second mounting portion comprising fibers embedded in a resin matrix to form said second mounting portion having an outer perimeter that is smaller than the outer perimeter of said main tubular body portion to provide a second shoulder on said composite tube, said energy absorbing composite tube further comprising a second delamination wedge located around the perimeter of said second mounting portion adjacent to said second shoulder, said delamination wedge being shaped to provide delamination of said main tubular body portion when said delamination wedge is forced against said second shoulder by said second impact member during an impact in which said first and second impact member move towards each other along the longitudinal axis of said composite tube, said delamination of said main tubular body portion providing absorption of said impact energy.

3. An energy absorbing composite tube according to claim 1 wherein the resin matrix is selected from the group of resins consisting of epoxy, nylon, polyester, vinylester, polypropylene, and acrylic.

4. An energy absorbing composite tube according to claim 1 wherein said resin fibers are selected from the group consisting of glass, carbon, ceramic, aramid, and thermoplastic.

5. An energy absorbing composite tube according to claim 1 wherein said main tubular body portion and said mounting portion have circular perimeters.

6. An energy absorbing composite tube according to claim 1 wherein said fibers are in the form of one or more layers having an orientation selected from the group consisting of woven, unidirectional or random fibers.

7. An energy absorbing system for absorbing impact energy comprising:
   A) a first impact member;
   B) a second impact member that is mounted to said first impact member;
   C) an energy absorbing composite tube that provides a mount between said first impact member and said second impact member, said energy absorbing composite tube comprising:
      a) a mounting portion comprising a first impact member mounting end that is insertable within a receptacle located in said first impact member, said mounting portion comprising fibers embedded in a resin matrix to form said mounting portion having an outer perimeter;
      b) a main tubular body portion that is integral with said mounting portion, said main tubular body portion comprising an end that is mounted to said second impact member, said main tubular body portion comprising fibers embedded in a resin matrix to form a main tubular body portion having an outer perimeter that is larger than the outer perimeter of said mounting portion to provide a shoulder around the perimeter of said mounting portion where it joins said main tubular body portion; and
   D) a delamination wedge located around the perimeter of said mounting portion adjacent to said shoulder, said delamination wedge shaped to provide delamination of said main tubular body portion when said delamination wedge is forced against said shoulder by said first impact member during an impact in which said first and second impact members move towards each other along the longitudinal axis of said composite tube, said delamination of said main tubular body portion providing absorption of said impact energy.

8. An energy absorbing system according to claim 7 wherein said resin matrix is selected from the group consisting of epoxy, nylon, polyester, vinylester, polypropylene, and acrylic.

9. An energy absorbing system according to claim 7 wherein said resin fibers are selected from the group consisting of glass, carbon, ceramic, aramid, and thermoplastic.

10. An energy absorbing system according to claim 7 wherein said main tubular body portion and said mounting portion have circular perimeters.

11. An energy absorbing system according to claim 7 wherein the orientation of said fibers are in the form of one or more layers having an orientation selected from the group consisting of woven, unidirectional or random fibers.

12. An energy absorbing system according to claim 7 wherein said first impact member is a vehicle and said second impact member is a bumper for said vehicle.

13. An energy absorbing system according to claim 7 wherein said vehicle is an automobile.

14. An energy absorbing system according to claim 7 wherein said delamination wedge is an integral part of said receptacle located in said first impact member.

15. An energy absorbing system according to claim 7 wherein the end of said main tubular body portion that is mounted to said second impact member comprises a second integral mounting portion comprising a second impact member mounting end that is insertable within a receptacle located in said second impact member, said second mounting portion comprising fibers embedded in a resin matrix to form said second mounting portion having an outer perimeter that is smaller than the outer perimeter of said main tubular body portion to provide a second shoulder on said composite tube, said energy absorbing composite tube further comprising a second delamination wedge located around the perimeter of said second mounting portion adjacent to said second shoulder, said delamination wedge being shaped to provide delamination of said main tubular body portion when said delamination wedge is forced against said second shoulder by said second impact member during an impact in which said first and second impact member move towards each other along the longitudinal axis of said composite tube, said delamination of said main tubular body portion providing absorption of said impact energy.

16. An energy absorbing system according to claim 15 wherein said second delamination wedge is an integral part of the receptacle located in said second impact member.

17. A method for absorbing energy during an impact, said method comprising the steps of:
   A) providing an impact energy absorption system comprising:
      a) a first impact member;
      b) a second impact member that is mounted to said first impact member;
      c) an energy absorbing composite tube that provides a mount between said first impact member and said second impact member, said energy absorbing composite tube comprising:
         1) a mounting portion comprising a first impact member mounting end that is insertable within a receptacle located in said first impact member, said mounting portion comprising fibers embedded in a resin matrix to form said mounting portion having an outer perimeter;
         2) a main tubular body portion that is integral with said mounting portion, said main tubular body portion comprising an end that is mounted to said second impact member, said main tubular body portion comprising fibers embedded in a resin matrix to form a main tubular body portion having an outer perimeter that is larger than the outer perimeter of said mounting portion to provide a shoulder around the perimeter of said mounting portion where it joins said main tubular body portion; and
      d) a delamination wedge located around the perimeter of said mounting portion adjacent to said shoulder, said delamination wedge shaped to provide delamination of said main tubular body portion when said delamination wedge is forced against said shoulder by said first impact member during an impact in which said first and second impact members move towards each other along the longitudinal axis of said composite tube, said delamination of said main tubular body portion providing absorption of said impact energy; and
   B) impacting said second impact member with a force having sufficient impact energy along the longitudinal axis of said composite tube to provide delamination of said main tubular body portion and absorption of at least a portion of said impact energy.

18. A method for absorbing impact energy according to claim 17 wherein said resin matrix is selected from the group of resins consisting of epoxy, nylon, polyester, vinylester, polypropylene, and acrylic.

19. A method for absorbing impact energy according to claim 17 wherein said fibers are selected from the group consisting of glass, carbon, ceramic, aramid, and thermoplastic.

20. A method for absorbing impact energy according to claim 17 wherein said main tubular body and said mounting portion have circular perimeters.

21. A method for absorbing impact energy according to claim 17 wherein said fibers are in the form of one or more layers having an orientation selected from the group consisting of woven, unidirectional or random fibers.

22. A method for absorbing impact energy according to claim 17 wherein said first impact member is a vehicle and said second impact member is a bumper for said vehicle.

23. A method for absorbing impact energy according to claim 22 wherein said vehicle is an automobile.

24. A method for absorbing impact energy according to claim 17 wherein said delamination wedge is an integral part of said receptacle located in said first impact member.

25. A method for absorbing impact energy according to claim 17 wherein the end of said main tubular body portion that is mounted to said second impact member comprises a second integral mounting portion comprising a second impact member mounting end that is insertable within a receptacle located in said second impact member, said second mounting portion comprising fibers embedded in a resin matrix to form said second mounting portion having an outer perimeter that is smaller than the outer perimeter of said main tubular body portion to provide a second shoulder on said composite tube, said energy absorbing composite tube further comprising a second delamination wedge located around the perimeter of said second mounting portion adjacent to said second shoulder, said delamination wedge being shaped to provide delamination of said main tubular body when said delamination wedge is forced against said second shoulder by said second impact member during an impact in which said first and second impact members move towards each other along the longitudinal axis of said composite tube, said delamination of said main tubular body portion providing absorption of said impact energy.

26. A method for absorbing impact energy according to claim 25 wherein said second delamination wedge is an integral part of the receptacle located in said second impact member.

27. A method for making an energy absorbing composite tube for use in mounting a first impact member to a second impact member, said method comprising the steps of:

A) forming a composite tube having a longitudinal axis, said composite tube comprising:
  a) a mounting portion comprising a first impact member mounting end that is insertable within a receptacle located in said first impact member, said mounting portion comprising fibers embedded in a resin matrix to form said mounting portion having an outer perimeter;
  b) a main tubular body portion that is integral with said mounting portion, said main tubular body portion comprising an end that is mountable to said second impact member, said main tubular body portion comprising fibers embedded in a resin matrix to form a main tubular body portion having an outer perimeter that is larger than the outer perimeter of said mounting portion to provide a shoulder around the perimeter of said mounting portion where it joins said main tubular body portion; and B) providing a delamination wedge located around the perimeter of said mounting portion adjacent to said shoulder, said delamination wedge shaped to provide delamination of said main tubular body portion when said delamination wedge is forced against said shoulder by said first impact member during an impact in which said first and second impact members move towards each other along the longitudinal axis of said composite tube, said delamination of said main tubular body portion providing absorption of said impact energy.

28. A method for making an energy absorbing composite tube according to claim 27 that includes the additional step of forming a second impact member mounting portion at the end of said main tubular body portion that is mountable to said second impact member, said second impact mounting portion comprising a mounting end that is insertable within a receptacle located in said second impact member, said second mounting portion comprising fibers embedded in a resin matrix to form said second mounting portion having an outer perimeter that is smaller than the outer perimeter of said main tubular body portion to provide a second shoulder on said composite tube, and providing a second delamination wedge located around the perimeter of said second mounting portion adjacent to said second shoulder, said delamination wedge being shaped to provide delamination of said main tubular body portion when said delamination wedge is forced against said second shoulder by said second impact member during an impact in which said first and second impact member move towards each other along the longitudinal axis of said composite tube, said delamination of said main tubular body portion providing absorption of said impact energy.

29. A method for making and energy absorbing composite tube according to claim 27 wherein the resin matrix is selected from the group of resins consisting of epoxy, nylon, polyester, vinylester, polypropylene, and acrylic.

30. A method for making an energy absorbing composite tube according to claim 27 wherein said resin fibers are selected from the group consisting of glass, carbon, ceramic, aramid, and thermoplastic.

31. A method for making an energy absorbing composite tube according to claim 27 wherein said main tubular body portion and said mounting portion have circular perimeters.

32. A method for making an energy absorbing composite tube according to claim 27 wherein said fibers are in the form of one or more layers having an orientation selected from the group consisting of woven, unidirectional or random fibers.

* * * * *